United States Patent

[11] 3,599,016

[72] Inventor Robert A. Leightner
Burlington, Vt.
[21] Appl. No. 843,625
[22] Filed July 22, 1969
[45] Patented Aug. 10, 1971
[73] Assignee General Electric Company

[54] AUTOMATIC RESET CIRCUIT
4 Claims, 5 Drawing Figs.

[52] U.S. Cl. .......... 307/247, 307/215, 307/234
[51] Int. Cl. .......... H03k 17/00, H03k 5/20
[50] Field of Search .......... 307/215, 291, 234, 247

[56] References Cited
UNITED STATES PATENTS

| | | | |
|---|---|---|---|
| 3,074,640 | 1/1963 | Maley | 307/215 X |
| 3,348,214 | 10/1967 | Barbetta | 307/215 X |
| 3,457,434 | 7/1969 | Henn | 307/215 X |
| 3,471,789 | 10/1969 | Nutting et al. | 307/215 X |

*Primary Examiner*—John S. Heyman
*Attorneys*—Bailin L. Kuch, Irving M. Freedman, Harry C. Burgess, Frank L. Neuhauser, Oscar B. Waddell and Joseph B. Forman

ABSTRACT: A reset circuit, for a logic circuit which processes pulses of at least a given time width, comprises a race loop circuit including a flip-flop, a gate having an input-to-output transfer delay greater than said given time width, and a driver or gate having an input-to-output transfer delay less than said given time width.

INVENTOR
ROBERT LEIGHTNER,

BY [signature]
HIS ATTORNEY.

PATENTED AUG 10 1971 3,599,016

INVENTOR:
ROBERT LEIGHTNER,

BY

HIS ATTORNEY.

AUTOMATIC RESET CIRCUIT

BACKGROUND OF THE INVENTION

1. Field of Art

This invention concerns automatic reset circuits for logic circuits, especially counters.

2. Prior Art

When power is initially supplied to a logic circuit having a plurality of equally possible alternative states, the circuit may assume any one of these states. In a system made up of a plurality of such circuits, such as a series counter, the system may assume any one of a number of combination states. In an electronic fuse for a projectile having a counter which is to detonate the payload after having accumulated a predetermined number of pulses, it is necessary that the counter invariably commence accumulating from a predetermined count.

RELATED PATENT

A weapon system utilizing the subject matter of this invention is disclosed and claimed in Ser. No. 843,478 filed July 22, 1969 by R. T. Ziemba.

BRIEF SUMMARY OF THE INVENTION

It is an object of this invention to provide an automatic reset circuit which will invariably set a logic circuit to a predetermined state when power is initially applied to said logic circuit and said reset circuit.

A feature of this invention is a reset circuit for a logic circuit, which logic circuit is adapted to process pulses of at least a given time width, said reset circuit comprising a race loop circuit including a flip-flop, a gate having an input-to-output-transfer delay greater than said given time width, and a driver or gate having an input-to-ouput-transfer delay less than said given time width.

BRIEF DESCRIPTION OF THE DRAWINGS

These and other objects, features and advantages of the invention will be apparent from the following specification thereof taken in conjunction with the accompanying drawing in which.

THE PREFERRED EMBODIMENT

Figure 1:
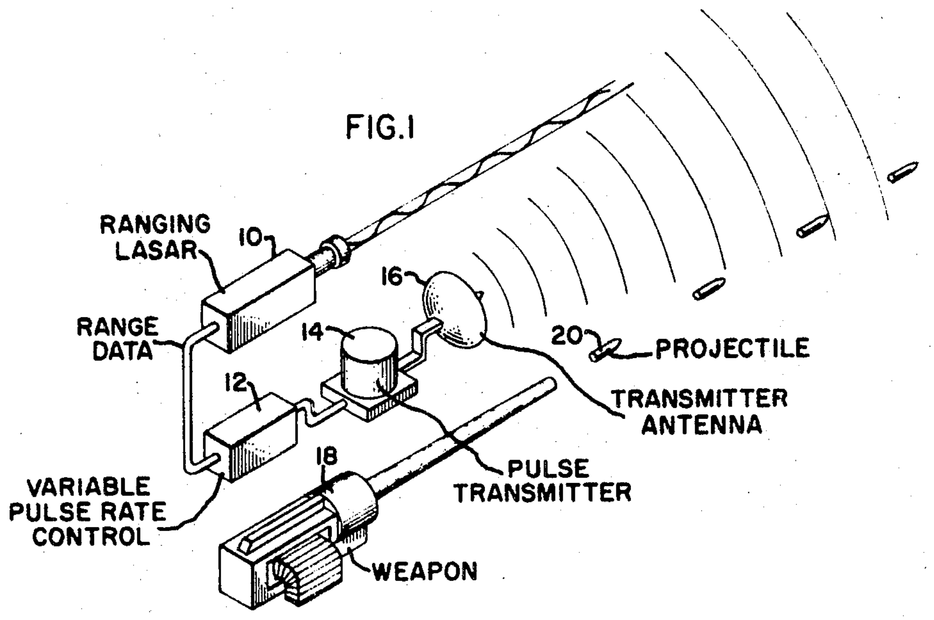
FIG. 1 is a diagram of a controlled range air burst fuze system for a shell incorporating this invention.
Figure 2:
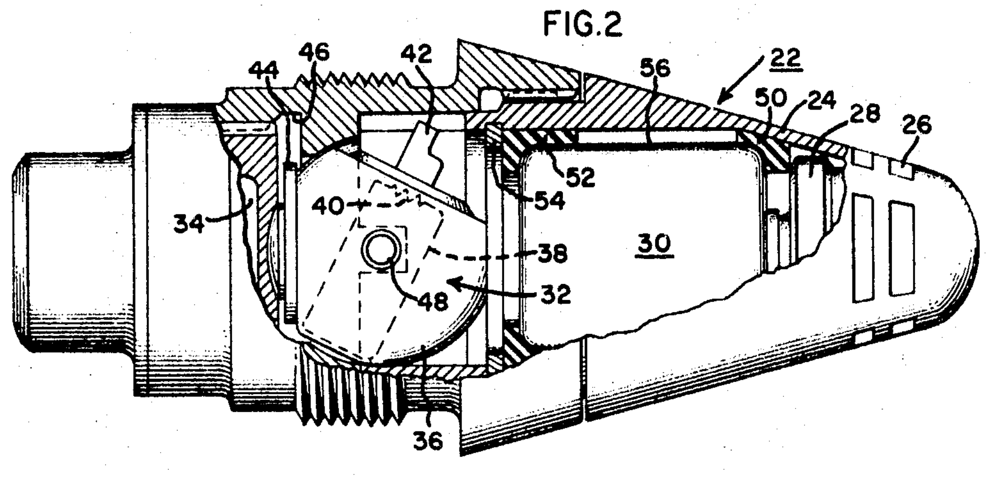
FIG. 2 is a side view, partially in cross section, of a fuze package according to this invention particularly adapted for insertion in the forward end of a 20 mm. round.
Figure 3:
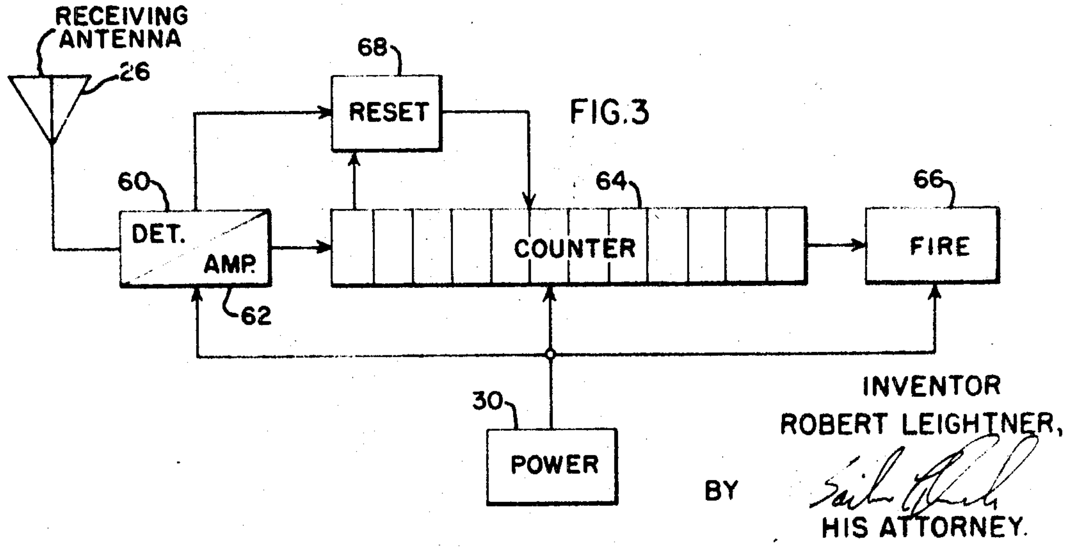
FIG. 3 is a block diagram of the electronic circuitry of the fuze of FIG. 2.

A weapon system is shown in FIG. 1 which includes a source of range data such as a ranging lasar 10, a variable pulse rate control 12, a pulse transmitter such as an X-band radar 14, a transmitter antenna 16, a weapon 18, and one or more projectiles 20. Each projectile 20 has a fuze 22 which, as seen in FIG. 2, includes a housing 24 containing an antenna such as a slot antenna 26, electronic circuitry 28, a battery 30, which may be a thermal battery, a rotor-detonator assembly 32 and a booster charge 34.

The rotor-detonator assembly 32 may be of the type shown in U.S. Pat. application Ser. No. 804,443 filed Mar. 5, 1969 by R. T. Ziemba. Briefly, the assembly 32 comprises an out-of-line ball rotor 36 having a detonator charge 38 with a filament 40 and a contact brush 42, and a C-shaped spring retainer 44. The rotor is held in the out-of-line, safe disposition until the projectile, in flight, has developed adequate spin to centrifugally enlarge and enable the spring retainer 44 to pass into an annular recess 46 in the housing to release the rotor. The rotor then rotates to axially align its center of gravity and the detonator charge with the longitudinal axis of the projectile. The rotor is journaled on a transverse axis at 48 to constrain the rotor to rotation within a predetermined longitudinal plane so that the contact 42 wipes through this plane.

The thermal battery 30 may be of the type shown in U.S. Pat. application Ser. No. 695,144 filed Jan. 2, 1968 by R. T. Ziemba. Briefly, the battery includes two electrodes spaced apart by a normally solid and nonconductive thermally fusible electrolyte. Thermitic material is mounted in thermally conductive relation with the electrolyte and is ignitable by a percussion cap which is disposed between two rigid surfaces, one of which is a relatively displaceable striker element. The battery is normally inactive, until the projectile is subjected to a setback force on firing, which causes the striker element to percuss the cap, which explodes and actuates the thermitic material, which melts the electrolyte to activate the battery. The battery 30 is supported in a cavity in the housing by a forward dielectric ring 50 and an aft dielectric ring 52 and is retained forward by a spring clip 54. The outer case 56 of the battery serves as the negative contact, and is adapted to be wiped by the detonator contact 42.

The electronic circuitry 28 includes the antenna 26, and a diode detector 60, a two-step video amplifier 62, a counter 64, a firing circuit 66, and a reset circuit 68. The antenna consists of a double four-port slot antenna, whose dimensions and probe phase are designed to increase antenna gain to the rear of the projectile. The slot configuration, using two diametrically opposed double pairs of adjacent slots, quarter-wave spaced, gives an antenna gain in the aft direction of +5 decibels over a standard dipole. Antenna power is peak detected with the hot carrier diode 60, whose output signal is the transmitted PRF envelope. The signal voltage level at this point is approximately 0.05 volt, from a 40 kilowatt (peak) transmitter at a 3,000-meter range. The detected pulses are amplified by the two-stage amplifier 62 to a level adequate to drive the counter 64. The counter consists of 12 flip-flop stages in a cascade configuration which provide an input-to-output count ratio of $2^{11}$ or 2,048. Switchover of the last stage is detected to actuate the output circuit, so only a count of 1,024 is realized from the counter. When the one-output terminal of the 11th flip-flop is low, and the zero-output terminal of the 12th flip-flop is low, the output terminal of the gate 66A will be high, drawing current via the output amplifiers 66B and 66C through the filament 40 of the detonator charge 38 to actuate the electrical detonator after a finite interval which is a function of time and current.

After the projectile is accelerated out of the weapon and the battery is actuated, the battery requires a finite period of time to reach full output voltage. When a voltage adequate for operating the flip-flops is reached, each of these flip-flops may assume either of its one terminal high and zero terminal low, or one terminal low and zero terminal high states. Absent the automatic reset circuit, should the 11th flip-flop one-output terminal be low and the 12th flip-flop zero terminal be low the detonator filament 40 will start drawing current. Detonation would otherwise occur after a period of time. Less catastrophic, but not desirable, should any of the flip-flop assume its one-output terminal high state, the counter will give a short count.

Figures 4, 5:
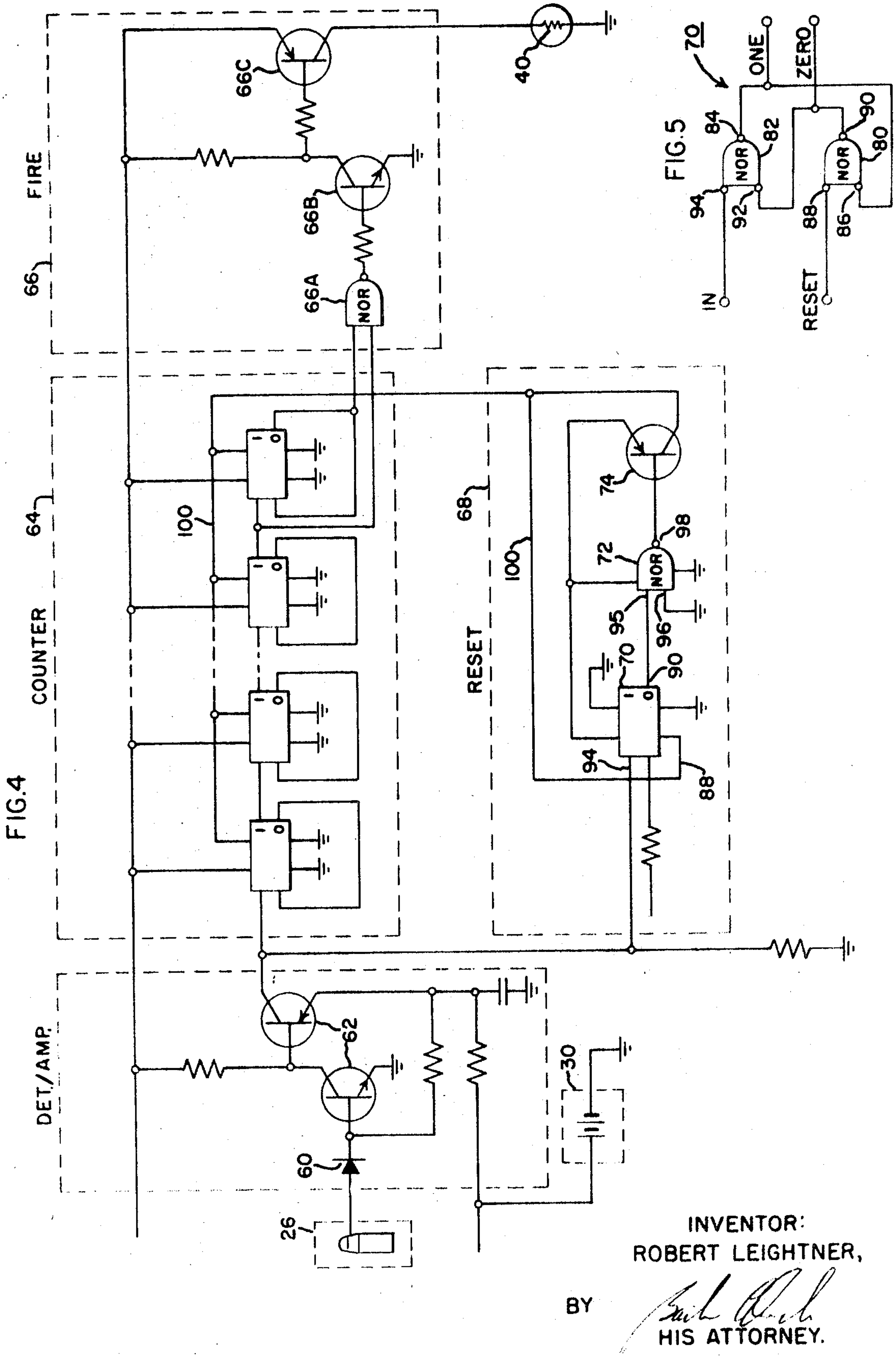
FIG. 4 is an electronic circuit diagram of the fuze of FIG. 2.
FIG. 5 is a block diagram of the electronic circuitry of the reset flip-flop.

The automatic reset circuit 68 forces each of the counter flip-flop one-output terminals to its low state upon the initial provision of power to the fuze from the battery 30. This reset occurs in less than 1 microsecond, which precludes premature actuation of the detonator. The reset flip-flop 70, the reset NOR-gate 72 and the reset PNP common emitter driver 74 are used to implement the reset circuit as a race loop. The reset flip-flop 70, as seen in FIG. 5, may be structured as two NOR-gates 80 and 82. The one output terminal 84 of the gate 82 is coupled to one of the input terminals 86 of the gate 80, whose other input terminal 88 serves as the pulse input terminal. The zero-output terminal 90 of the gate 80 is coupled to one of the input terminals 92 of the gate 82, whose other input terminal 94 serves as the reset input terminal. The zero-output terminal 90 of the flip-flop 70 is coupled to one input terminal 95 of the NOR-gate 72, whose other input terminal 96 is coupled to ground. The output terminal 98 of the gate is coupled to the base of the driver 74. The emitter of the driver is coupled to the supply voltage and the collector is coupled to the reset bus 100. The NOR-gate 72 provides the longest delay in the loop, i.e., the slowest input to output transfer; and the driver provides the least delay.

The operation of the reset circuit may be broken in three phases, viz: Phase I, the interval during driving power coming up; Phase II, the interval after reset and before receipt of the first transmitter pulse; and Phase III, the action on receipt of the first transmitter pulse.

Consider Phase I. The reset flip-flop zero output terminal 90 may initially assume either a high or low state. Assume the zero-output terminal 90 is high, then the NOR-gate output terminal 98 is initially and steady state low, the base electrode is initially and steady state low, and the driver initially and steady state conducts so that the reset bus 100 is initially and steady state high. The high signal on the reset bus resets all of the counter flip-flops. The high reset signal at input terminal 94 also provides a low signal at output terminal 84 and thence a low signal at input terminal 86 and thus maintains output terminal 90 high. Now assume the zero output terminal is low, the the NOR-gate output terminal 98 is initially low, and because of the long transfer delay, the base electrode is initially low and the driver initially conducts so that the reset bus 100 is initially high. The initial high signal on the reset bus 100 resets all of the counter flip-flops, and also resets the reset flip-flop. After the long transfer delay the NOR-gate output terminal 98 becomes high, making the base electrode high and turning off the driver so that the reset bus becomes low. However, the reset flip-flop has already been reset, so that its zero-output terminal is now high, and as described previously, the driver conducts and the reset bus again becomes high.

Thus, in Phase II, the reset flip-flop zero-output terminal is high, the NOR-gate output terminal 98 is low, the driver conducts, and the reset bus 100 is high. Also, the reset flip-flop one-output terminal 84 is low.

When, in Phase III, the first transmitter pulse is received, it is coupled to the input terminal 94 so that the zero-output terminal 90 goes low. The one-output terminal 84 remains low. However, the transmitter pulse is shaped to have a width greater than the NOR-gate 72 transfer delay, so that when the NOR-gate output terminal 98 goes high the driver stops conducting, making the reset bus 100 low, and the one-output terminal high, while the zero-output terminal remains low. The reset bus remains low, and the counter is free to count subsequent transmitter pulses without reset. It may be noted that during the interval that the first transmitter pulse is present, the reset flip-flop has assumed a unique third state of both output terminals low.

The advantages of the reset circuit include:

1. Priority and speed of operation sufficient to preclude accidental detonation.

2. Independence of the rise characteristics of the power supply.

3. Ease of testing the configuration before assembly to the warhead since operation is dependent only on the presence of a voltage which might cause an accidental detonation.

The counter and reset flip-flops may be 913 elements and the NOR-gates may be 910 elements as shown in the May, 1964 catalogue of Fairchild Semiconductor Division of Fairchild Camera and Instrument Corporation.

What I claim is:

1. A power-on, reset pulse-generating circuit, which is adapted to be energized by a power source for use with a logic circuit, and which logic circuit is adapted to process signal pulses of at least a given time width, comprising:

flip-flop means having a signal input terminal, an output terminal, and a reset input terminal;

first gate means having an input terminal and an output terminal, and an input-to-output transfer delay greater than said given time width; and second gate means having an input terminal, an output terminal and an input-to-output transfer delay less than said given time width;

said flip-flop means output terminal being coupled to said first gate means input terminal, and said first gate means output terminal being coupled to said second gate means input terminal; and said second gate means output terminal being coupled to said flip-flop means reset input terminal and serving as a reset pulse source for the logic circuit;

whereby said reset circuit has three phases of operation, viz: Phase I, the interval during initial energization, during which a reset pulse is generated; Phase II, the interval after the generation of a reset pulse and before the receipt of a signal pulse; and Phase III, the action on receipt of the first signal pulse; and in Phase I, the flip-flop means output terminal initially may assume either a high or low state; if high, the first gate means output terminal is initially and steady state low, the second gate means output terminal is initially and steady state high, which resets the logic circuit, and maintains the flip-flop means output terminal high; and if low, the first gate means output terminal is initially low, and the second gate means output terminal is initially high, which resets the logic circuit and the flip-flop means, and returns the second gate means output terminal to high;

in Phase II, the flip-flop means output terminal is high, the first gate means output terminal is low, and the second gate means output terminal is high; and in Phase III, the first signal pulse causes the flip-flop means output terminal to go low, the first gate means output terminal goes high, the second gate means output goes low, and no further reset pulses are generated.

2. A reset circuit according to claim 1 wherein: said flip-flop means comprises:

a first NOR-gate having first and second input terminals and an output terminal, and a second NOR-gate having first and second input terminals, and an output terminal;

said first gate output terminal being coupled to said second gate second input terminal;

said second gate output terminal being coupled to said first gate second input terminal and serving as said flip-flop output terminal, said first gate first input terminal serving as said flip-flop reset terminal, and said second gate first input terminal serving as said flip-flop input terminal.

3. A reset circuit according to claim 1 wherein:

said first gate means comprises:

a third NOR-gate having first and second input terminals and an output terminal, said first input terminal serving as said first gate input terminal, said second input terminal being coupled to a steady-state signal bus, and said output terminal serving as said first gate output terminal.

4. A reset circuit according to claim 1 wherein said second gate means comprises:

a common-emitter driver having a base electrode serving as said signal gate input terminal, an emitter coupled to supply voltage and a collector serving as said second gate output terminal.